Oct. 22, 1935.   J. SOUSEDÍK   2,018,287
VARIABLE SPEED THREE-PHASE MOTOR WITH VARIABLE TORQUE
Filed June 22, 1932
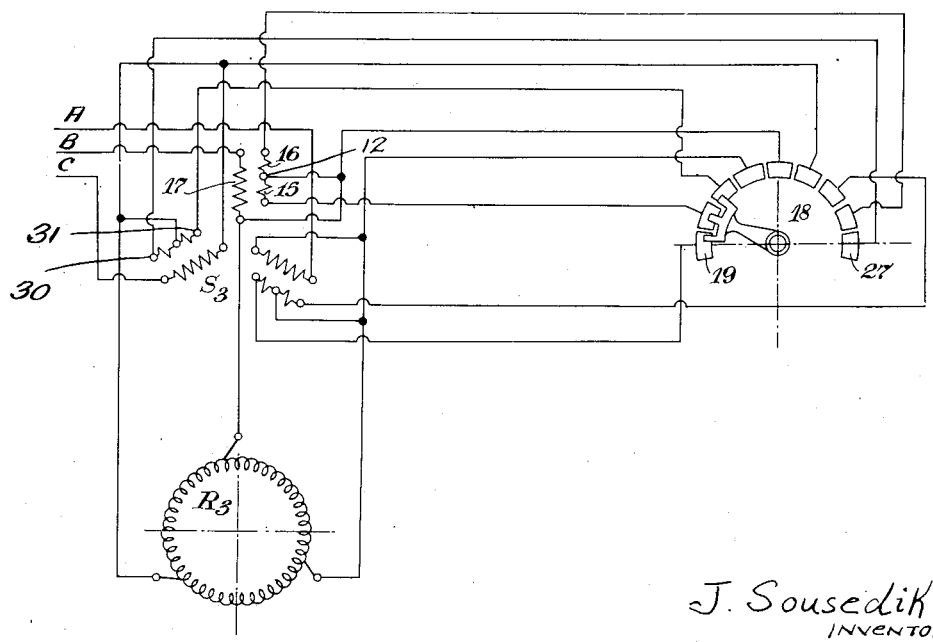
J. Sousedík
INVENTOR
By Marks & Clerk
ATT'YS.

Patented Oct. 22, 1935

2,018,287

UNITED STATES PATENT OFFICE 2,018,287

VARIABLE SPEED THREE-PHASE MOTOR WITH VARIABLE TORQUE

Josef Sousedik, Vsetin, Czechoslovakia

Application June 22, 1932, Serial No. 618,787
In Czechoslovakia May 1, 1931

2 Claims. (Cl. 172—274)

The requirements concerning the economical speed regulation of electric motors are bound with their general technical development, which has hitherto been hindered by the characteristic of alternating and multiphase current motors, that the torque of these motors remains constant at all speeds and is limited by the maximum torque.

In most drives of machines working at variable speed the required torque thereof also varies and for this reason it was always necessary to choose such a motor which gave the maximum torque required by the machine so that the motor was either not fully utilized at the minimum speed and therefore did not work economically (as for instance, for the driving of centrifugal pumps, ventilators, etc.) or the motor had to be dimensioned for the maximum torque that came into question, as for instance, for the driving of paper machines, rolling mills and the like, which require a larger torque at a lower speed, so that again the motor was not fully utilized at high speeds and worked with a poor efficiency and power factor.

The object of the present invention is to provide a three phase commutator motor, the speed regulation of which will be economical and which will make it possible to determine the characteristic of the motor with variable torque either for an increasing torque with increasing speed or for a decreasing torque with increasing speed.

The invention consists in varying the strength of the magnetic field of the motor in such a manner that a secondary current of definite voltage is applied to the primary circuit of the motor, either directly or through a transformer, which secondary current is either added or subtracted with a definite position of the regulator when the motor has a definite speed irrespective of the manner in which the specific output of the motor is varied.

The figure illustrates a diagram of connections of a motor with variable speed and torque for units of small outputs. In this case the secondary or commutator side $R_3$ of the motor is fed directly from the divided windings 15, 16 which are provided on the primary or stator part $S_3$ of the motor. The circuit of the divided windings 15, 16 includes a specially constructed divided switch having terminal contacts 19—27 and provided with a movable arm 18, which, for the purpose of speed regulation in subsynchronism and hypersynchronism constitutes a displaceable contact point; also the leads from the commutator and the ends of the primary winding 17 (stator winding) are connected thereto, the primary winding being also connected to the supply circuit ABC. By adjusting the contact point 18 the direction of the voltage and current is altered. The voltage is either added to that of the primary or subtracted therefrom. In this arrangement a change in the strength of the magnetic flux is obtained in the stator $S_3$ of the motor together with a variation in the speed whereby also the output of the motor is varied. It is also possible by changing over the ends 30, 31 of the auxiliary divided windings to change the characteristic of the torque so that the torque of the motor either increases or decreases with the speed. By displacing the connection points 12 on the divided winding, the ratio of the regulator for subsynchronism and hypersynchronism can be adjusted.

As the secondary or commutator side of the motor is fed from the regulating winding which is either directly induced in the primary or induced through a separate transformer, the common circuit of the primary winding (stator) and commutator winding of the secondary part (rotor) of the motor is closed so that by changing either the connections of the divided regulating winding the primary and the secondary side are closed together and no difficulties can arise when the connections of the divided winding are changed over as to whether the change over is effected simultaneously in all phases or separately in each phase.

What I claim is:—

1. A three-phase commutator motor with variable speed and torque having a primary stator winding and a secondary rotor winding, divided auxiliary windings mounted on the said stator, a commutator connected to the said rotor, a divided contact switch to which the said divided auxiliary windings, commutator and the stator winding are connected, and which has a movable contact arm serving as a neutral point and capable of being displaced according to the requirements of speed regulation for sub and hypersynchronism and for effecting a change in the direction of the current and voltage so that the voltage may be either added to or subtracted from the primary voltage, for the purpose of changing the output of the motor and if desired also the characteristic thereof, by changing over the ends of the auxiliary windings so that the torque either increases or decreases with the speed, as set forth.

2. A three-phase commutator motor with variable speed and torque as claimed in claim 1, in which the rotor winding is fed from the divided auxiliary windings in which a current is induced from the primary stator winding or through a transformer, and the common circuit of the stator winding and rotor winding is closed, so that no difficulties can arise when the divided auxiliary windings are changed over, whether the changing over takes place simultaneously in all phases or separately.

JOSEF SOUSEDÍK.